US012619826B2

(12) United States Patent
Honke et al.

(10) Patent No.: US 12,619,826 B2
(45) Date of Patent: May 5, 2026

(54) FINDING COHERENT INFERENCES ACROSS DOMAINS

(71) Applicant: X Development LLC, Mountain View, CA (US)

(72) Inventors: Garrett Raymond Honke, Mountain View, CA (US); David Andre, San Francisco, CA (US); Alberto Camacho Martinez, San Mateo, CA (US); Irhum Shafkat, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 712 days.

(21) Appl. No.: 17/977,681

(22) Filed: Oct. 31, 2022

(65) Prior Publication Data

US 2024/0143929 A1 May 2, 2024

(51) Int. Cl.
| | |
|---|---|
| *G06F 40/30* | (2020.01) |
| *G06F 8/41* | (2018.01) |
| *G06N 20/00* | (2019.01) |
| *G06F 16/334* | (2025.01) |

(52) U.S. Cl.
CPC .............. *G06F 40/30* (2020.01); *G06F 8/436* (2013.01); *G06N 20/00* (2019.01); *G06F 16/3344* (2019.01)

(58) Field of Classification Search
CPC ...... G06F 16/3344; G06F 40/30; G06F 18/22; G06N 3/08; G06N 20/00
See application file for complete search history.

(56) References Cited

U.S. PATENT DOCUMENTS

| | | | | |
|---|---|---|---|---|
| 2009/0281789 | A1* | 11/2009 | Waibel | G06F 40/40 |
| | | | | 704/260 |
| 2021/0303638 | A1* | 9/2021 | Zhong | G06F 18/231 |
| 2022/0284321 | A1* | 9/2022 | Yuan | G06N 5/04 |

OTHER PUBLICATIONS

Thagard, et al. "Coherence as Constraint Satisfaction," Cognitive Science, 1998, (Year: 1998).*

(Continued)

*Primary Examiner* — Feng-Tzer Tzeng
(74) *Attorney, Agent, or Firm* — Gray Ice Higdon

(57) ABSTRACT

Disclosed implementations relate to using mutual constraint satisfaction to sample from different stochastic processes and identify coherent inferences across domains. In some implementations, a first domain representation of a semantic concept may be used to conditionally sample a first set of candidate second domain representations of the semantic concept from a first stochastic process. Based on second domain representation(s) of the first set, candidate third domain representations of the semantic concept may be conditionally sampled from a second stochastic process. Based on candidate third domain representation(s), a second set of candidate second domain representations of the semantic concept may be conditionally sampled from a third stochastic process. Pairs of candidate second domain representations sampled across the first and second sets may be evaluated. Based on the evaluation, second domain representation(s) of the semantic concept are selected, e.g., as input for a downstream computer process.

16 Claims, 8 Drawing Sheets

(56)  References Cited

OTHER PUBLICATIONS

Keller, et al. "What You See is What it Means! Semantic Representation Learning of Code based on Visualization and Transfer Learning," ACM Transactions on Software Engineering and Methodology, Dec. 2021. (Year: 2021).*

Banerjee, et al. "Programming Language Conversion using NLP," American Journal of Science & Engineering, 2023. (Year: 2023).*

Tsunoo, et al. "Streaming Transformer ASR With Blockwise Synchronous Beam Search," arXiv, 2020 (Year: 2020).*

Zhang, et al. "Natural language generation and deep learning for intelligent building codes," Advanced Engineering Informatics, Apr. 2022. (Year: 2022).*

Tsunoo, et al. "Streaming Transformer ASR With Blockwise Synchronous Beam Search," arXiv, 2020—see attached reference in the previous Office action. (Year: 2020).*

Zhang, et al. "Natural language generation and deep learning for intelligent building codes," Advanced Engineering Informatics, Apr. 2022. (Year: 2022)—see attached reference in the previous Office action. (Year: 2022).*

Rumelhart et al., "An Interactive Activation Model of Context Effects in Letter Perception: Part 2. The Contextual Enhancement Effect and Some Tests and Extensions of the Model" American Psychological Association, Inc. Psychological Review, vol. 89, No. 1, 60-94, 18 pages, dated 1982.

McClelland et al., "Placing language in an integrated understanding system: Next steps toward human-level performance in neural language models" PNAS. vol. 117, No. 42. Retrieved from www.pnas.org/cgi/doi/10.1073/pnas.1910416117, 9 pages, dated Aug. 14, 2020.

Simon Frederik Streicher, "Incremental Inference on Higher-Order Probabilistic Graphical Models Applied to Constraint Satisfaction Problems" Stellenbosch University, 129 pages, dated Apr. 2022.

McClelland et al., "Interactive Activation and Mutual Constraint Satisfaction in Perception and Cognition" Cognitive Science. DOI: 10.1111/cogs.12146, 51 pages, dated 2014.

Dohan et al., "Language Model Cascades" arXiv:2207.10342v2 [cs.CL], 13 pages, dated Jul. 28, 2022.

* cited by examiner

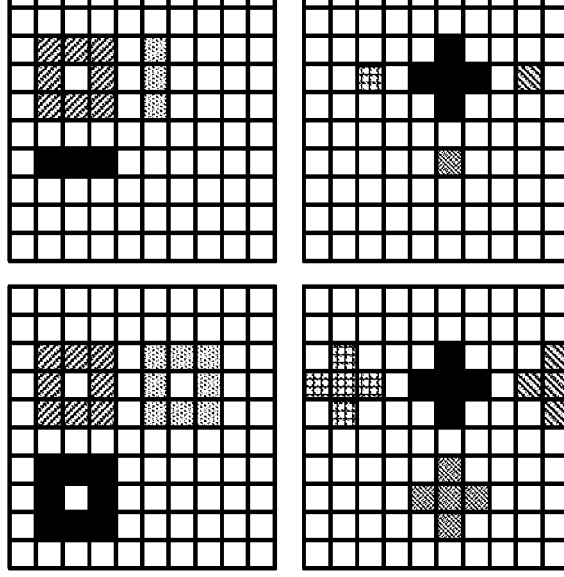
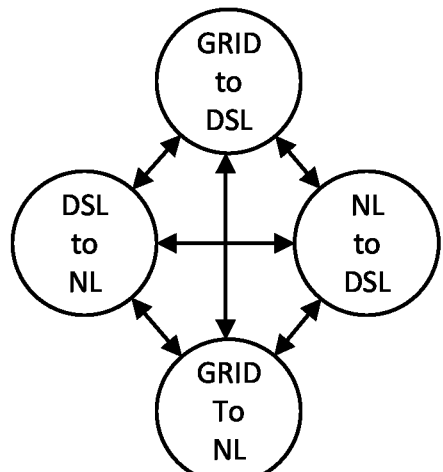
Fig. 4

HERE'S WHAT I CAME UP WITH

IN THE INPUT, YOU SHOULD SEE A SHAPE WITH TWO PARTIAL PARTS OF THAT SAME SHAPE IN DIFFERENT COLORS ORIENTED IN DIFFERENT DIRECTIONS FROM THE MAIN SHAPE.

THE OUTPUT GRID SIZE IS THE SAME. TO MAKE THE OUTPUT, YOU HAVE TO COMPLETE THE PATTERN FOR THE OTHER TWO COLORS WHICH ARE BLUE AND PINK TO BE JUST LIKE SHAPE OF GRAY AND FROM THERE FOLLOW THE SAME SPACE AND CONTINUE THE DRAW TO THE END.

HERE IS <DSL> CODE DESCRIBING THE TRANSFORMATION: FILE.DSL

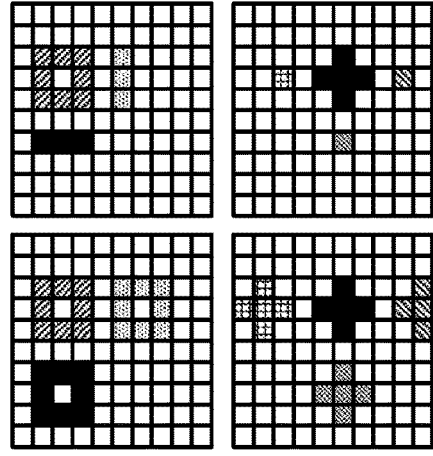

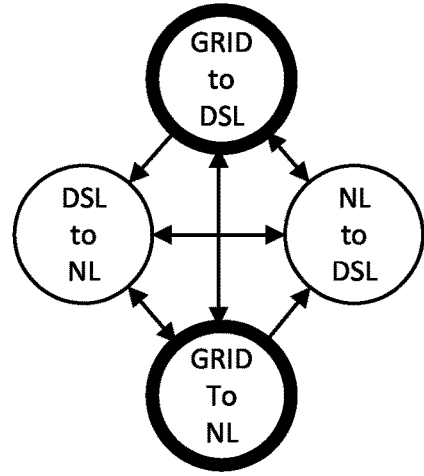

Fig. 5

SOMETHING DOESN'T LOOK RIGHT.
I THINK OUR SOLUTION MAY NEED
SOME HELP.  TRY THIS:
THE OUTPUT IS THE SAME SIZE AS
THE INPUT AND THE TASK IS TO
IDENTIFY THE LARGEST CLOSELY-
CONNECTED SHAPE OF A SINGLE
COLOR AND REPLICATE IT ALONG
THE AXIS IDENTIFIED BY THE
PARTIAL SHAPES.
*LET ME THINK ABOUT THAT FOR A MOMENT*
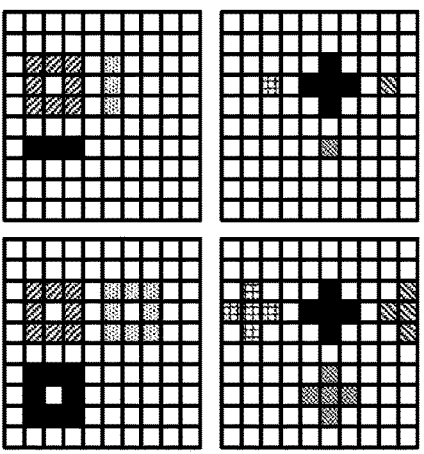
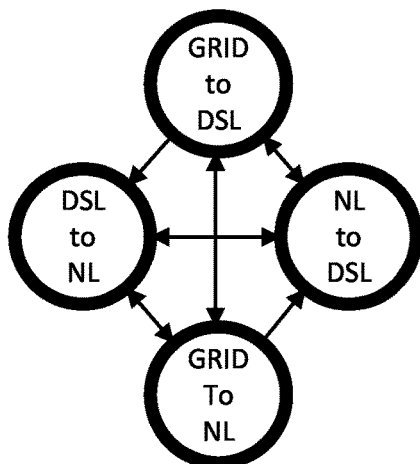
Fig. 6

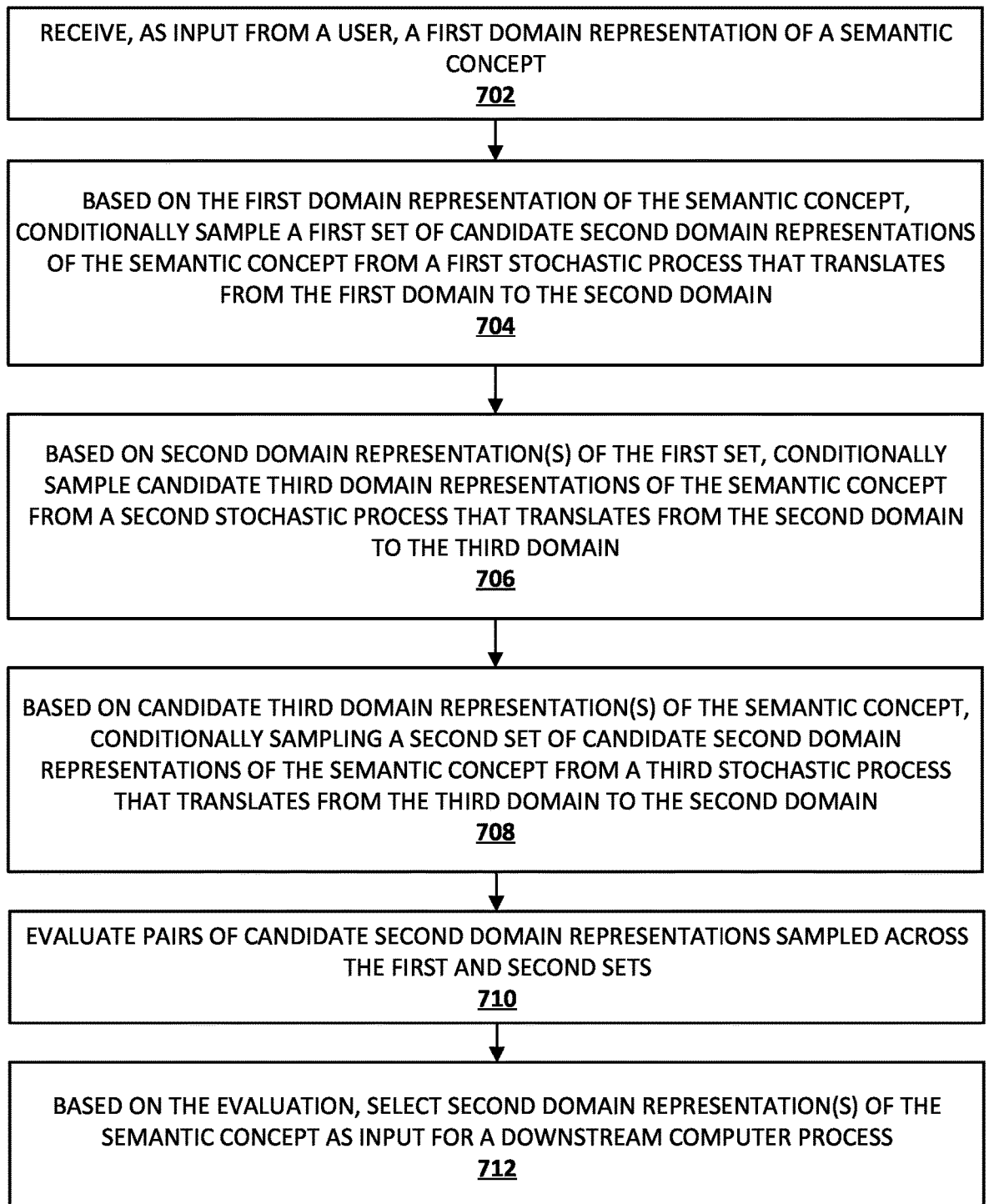

RECEIVE, AS INPUT FROM A USER, A FIRST DOMAIN REPRESENTATION OF A SEMANTIC CONCEPT
702

BASED ON THE FIRST DOMAIN REPRESENTATION OF THE SEMANTIC CONCEPT, CONDITIONALLY SAMPLE A FIRST SET OF CANDIDATE SECOND DOMAIN REPRESENTATIONS OF THE SEMANTIC CONCEPT FROM A FIRST STOCHASTIC PROCESS THAT TRANSLATES FROM THE FIRST DOMAIN TO THE SECOND DOMAIN
704

BASED ON SECOND DOMAIN REPRESENTATION(S) OF THE FIRST SET, CONDITIONALLY SAMPLE CANDIDATE THIRD DOMAIN REPRESENTATIONS OF THE SEMANTIC CONCEPT FROM A SECOND STOCHASTIC PROCESS THAT TRANSLATES FROM THE SECOND DOMAIN TO THE THIRD DOMAIN
706

BASED ON CANDIDATE THIRD DOMAIN REPRESENTATION(S) OF THE SEMANTIC CONCEPT, CONDITIONALLY SAMPLING A SECOND SET OF CANDIDATE SECOND DOMAIN REPRESENTATIONS OF THE SEMANTIC CONCEPT FROM A THIRD STOCHASTIC PROCESS THAT TRANSLATES FROM THE THIRD DOMAIN TO THE SECOND DOMAIN
708

EVALUATE PAIRS OF CANDIDATE SECOND DOMAIN REPRESENTATIONS SAMPLED ACROSS THE FIRST AND SECOND SETS
710

BASED ON THE EVALUATION, SELECT SECOND DOMAIN REPRESENTATION(S) OF THE SEMANTIC CONCEPT AS INPUT FOR A DOWNSTREAM COMPUTER PROCESS
712

Fig. 7     700

FINDING COHERENT INFERENCES ACROSS DOMAINS

BACKGROUND

Multiple stochastic processes may be used to process a representation of a semantic concept (e.g., an environment, state of a world) in one domain or modality and generate corresponding representations (e.g., "inferences," "translations") in other domains or modalities. In many cases, each stochastic process may generate multiple different candidate inferences within a respective domain. The inference having the highest probability or confidence may be selected for use in downstream processing. However, the highest probability inferences generated by two different stochastic processes in two different domains may not be coherent with each other. The inferences may diverge semantically and/or functionally, for instance. Consequently, it may be not clear which inference—or whether either inference—is most suitable for downstream processing.

SUMMARY

Implementations are described herein for finding a coherent and joint interpretation of a semantic concept across multiple domains and/or modalities, such as visual, natural language, and executable programming language domains, to name a few. More particularly, but not exclusively, techniques described herein relate to using mutual constraint satisfaction to sample from an ensemble of different stochastic processes—especially those applying trained machine learning models—and identify inferences that, irrespective of their individual probabilities or confidences, are coherent across different domains, and therefore may comprise high-quality representations of a given semantic concept. Implementations described herein may facilitate an overall (e.g., cross-modality) interpretation of a semantic concept that has the greatest joint probability, or an interpretation that is not ruled out by any individual stochastic process. The identified inference(s) may then be provided for downstream processing, such as responding to a user's request, or as part of a larger processing pipeline.

In some implementations, a method may be implemented using one or more processors and may include: receiving, as input from a user, a first domain representation of a semantic concept; based on the first domain representation of the semantic concept, conditionally sampling a first set of candidate second domain representations of the semantic concept from a first stochastic process that translates from the first domain to the second domain; based on one or more second domain representations of the first set, conditionally sampling candidate third domain representations of the semantic concept from a second stochastic process that translates from the second domain to the third domain; based on one or more of the candidate third domain representations of the semantic concept, conditionally sampling a second set of candidate second domain representations of the semantic concept from a third stochastic process that translates from the third domain to the second domain; evaluating pairs of candidate second domain representations sampled across the first and second sets; and based on the evaluation, selecting one or more of the second domain representations of the semantic concept as input for a downstream computer process.

In various implementations, the evaluation may include: determining similarity measures between a first plurality of reduced-dimensionality embeddings generated from the candidate second domain representations of the first set and a second plurality of reduced-dimensionality embeddings generated from the candidate second domain representations of the second set; and based on the similarity measures, selecting the one or more second domain representations of the semantic concept as the input for the downstream computer process.

In various implementations, the first stochastic process may include an attention-based transformer machine learning model, and the first set of candidate second domain representations of the semantic concept comprises multiple candidate token sequences generated by performing beam searching during application of the attention-based transformer machine learning model.

In various implementations, the second domain may include a programming language domain, and the candidate second domain representations in the first and second sets comprise candidate instances of source code. In various implementations, the evaluation may include: executing or interpreting a first candidate instance of source code sampled from the first set to generate a first output; executing or interpreting a second candidate instance of source code sampled from the second set to generate a second output; and comparing the first and second outputs. In various implementations, the evaluation further includes comparing the first output to the first domain representation of the semantic concept.

In various implementations, the third domain may be natural language, and the candidate third domain representations of the semantic concept may include natural language descriptions of respective pieces of source code in the first set.

In various implementations, the first domain representation of the semantic concept may include one or more images that depict a base visual state and a successor visual state. In various implementations, the method may include applying a contrastive model to compare one or more candidate second domain representations sampled from the first set with one or more of the candidate third domain representations of the semantic concept using a contrastive model, wherein the selecting is further based on output generated from applying the contrastive model.

In various implementations, at least one of the first, second, and third stochastic processes may include an attention-based transformer machine learning model.

In addition, some implementations include one or more processors of one or more computing devices, where the one or more processors are operable to execute instructions stored in associated memory, and where the instructions are configured to cause performance of any of the aforementioned methods. Some implementations include at least one non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4, FIG. 5, and FIG. 6 schematically depict an example of how techniques described herein may be implemented as part of a human-to-computer dialog, in accordance with various implementations.

FIG. 7 is a flowchart illustrating another example method of practicing selected aspects of the present disclosure, according to implementations disclosed herein.

DETAILED DESCRIPTION

Figure 1:
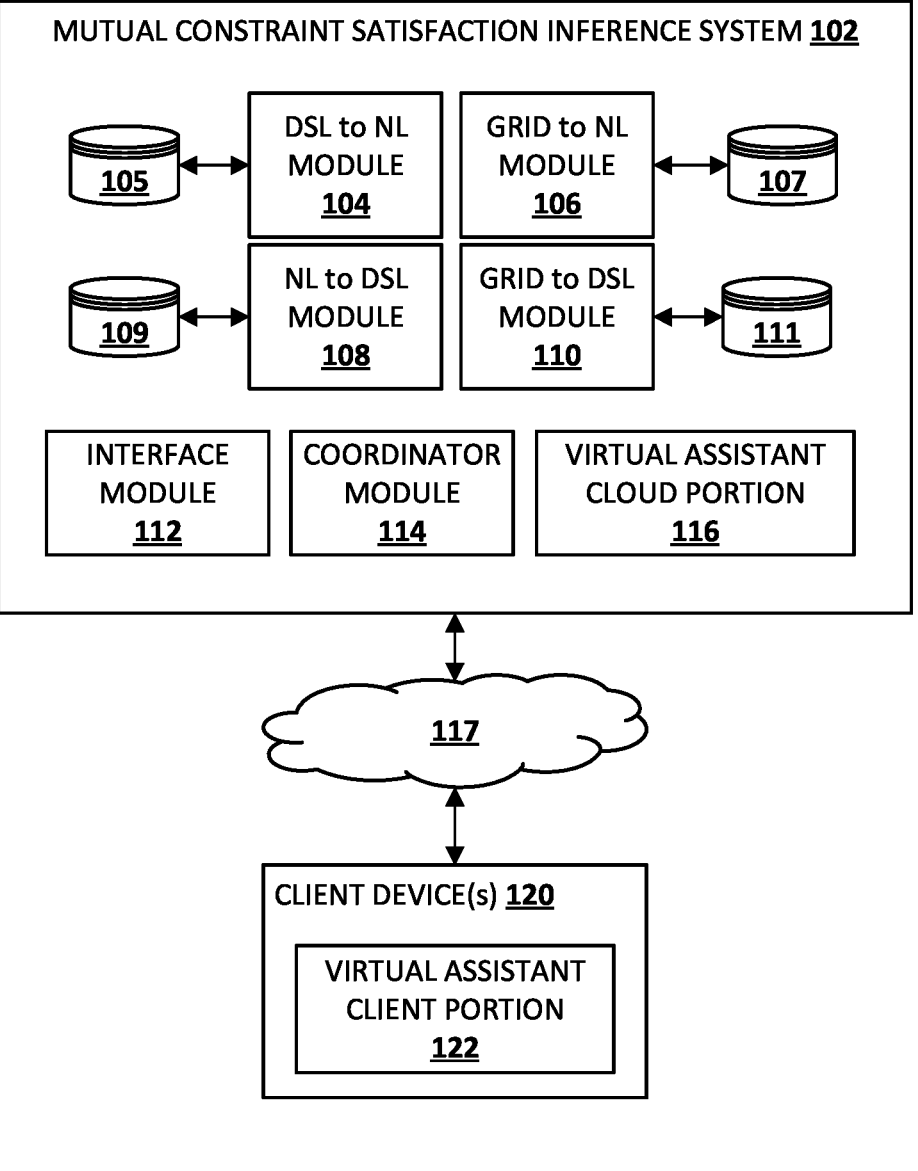
FIG. 1 is a schematic diagram of an example environment in which implementations disclosed herein may be implemented.

Implementations are described herein for finding a coherent and joint interpretation of a semantic concept across multiple domains. More particularly, but not exclusively, techniques described herein relate to using mutual constraint satisfaction to sample from multiple different stochastic processes—especially those applying trained machine learning models—and identify inferences that, irrespective of their individual probabilities or confidences, are coherent across different domains, and therefore may comprise high-quality representations of a given semantic concept. The identified inference(s) may then be provided for downstream processing, such as responding to a user's request, or as part of a larger processing pipeline.

A stochastic process, which may also be referred to as an "input analyzer" that applies a "foundation model" to data, may include, for instance, a process that applies machine learning model(s) to a representation of a semantic concept in one domain to sample (e.g., generate) representation(s) of the semantic concept in another domain. In implementations where the first domain input and/or desired second domain output is sequential, a stochastic process may apply attention-based machine learning model (e.g., a transformer) to generate one or more candidate sequences (e.g., of tokens) that represent the semantic concept with various degrees of confidence or probabilities. For example, beam searching may be performed when applying the machine learning model to the input to generate, as output, a plurality of candidate sequences, each having some associated probability or confidence. Typically, the highest probability candidate sequence is selected (e.g., as the best translation, natural language description, interpretation, etc.) for downstream processing. With implementations described herein, by contrast, mutual constraint satisfaction is enforced between multiple different stochastic processes to identify representations of semantic concepts (e.g., inferences) that are more coherent across domains.

In various implementations, various stochastic processes may be arranged as or organized pursuant to a graph, with nodes representing the stochastic processes and edges representing the propagation of information between the stochastic processes. In some implementations, this graph may be a probabilistic graphical model. The graph may be used to coordinate propagation of information (e.g., stochastic inferences resulting from the flow of information across the units of an artificial neural network trained to produce natural language interpretations of visual scenes) between the various stochastic processes, so that coherent inferences can be selected from one or more of the stochastic processes for downstream processing. In some implementations, the graph may include cycles that result in generation of multiple different sets of inferences in a particular domain via multiple different traversals of the graph. Tuples (e.g., pairs) of these inferences may be selected across the multiple different sets for comparison. This comparison may facilitate selection of the most coherent, as opposed to the highest probability, inference from a particular domain for downstream processing.

In some implementations, techniques described herein may be practiced as illustrated by the following working example. A first domain representation of a semantic concept may be received, e.g., as input from a user along with a command to generate a representation of the semantic concept in a second domain. Various types of semantic concepts may be represented across various domains in various ways. As one example, a user may provide computer program inputs and target outputs, along with a command to automatically create a computer program that can operate on the inputs to generate the outputs. These inputs and outputs may be provided in various modalities, such as text, images, sound recordings, states, etc. As another example, a user could provide one or more images depicting a predecessor and successor state of some visual environment. Other examples are contemplated.

Based on the first domain representation of the semantic concept, a first set of candidate second domain representations of the semantic concept may be conditionally sampled from a stochastic process that translates from the first domain to the second domain. "Conditional sampling" may refer to processing a first domain input using at least a portion of a machine learning model to generate one or more probability distributions within a second domain's search space. As mentioned elsewhere herein, domains/modalities can include, for instance, natural language, symbolic, visual, simulation, etc. If the first domain input is sequential (e.g., sequences of words, tokens, pixel values, time series data, commands, keystrokes, etc.), the machine learning model may be a Sq2Sq machine learning model that is applied iteratively to the sequential domain input to generate one or more sequences of output in the second domain. At each iteration of the Sq2Sq machine learning model, a new probability distribution over candidates (e.g., actions, tokens, etc.) in the second domain's search space may be determined. One or more of the candidates may be selected at each iteration based on the respective probability distribution.

Put another way, various techniques described herein approximate a joint distribution—where sampling produces a multi-modal interpretation of the state of the world—composed of independent conditional distributions from a set of numerous possible domains (e.g., vision, language, audio, motor programs) parameterized by artificial neural networks (e.g., an attention-supported transformer and beam search). The unique joint distribution approximated by these various marginal, conditional distributions may be a "best guess" for an interpretation of each of the individual domains conditioned on every other domain. A notable benefit is that if inferences can be made in one domain, those inferences can further constrain representations in other domains.

As an example, if the first domain represents imagery, the second domain may represent natural language (NL) and/or a domain specific language (DSL). With the former, the stochastic process may be an image-to-NL translator and the first set of candidate second domain representations may include multiple different natural language descriptions or interpretations of the semantic concept represented by the image input. With the latter, the stochastic process may be an image-to-DSL translator and the first set of candidate second domain representations may include multiple different DSL interpretations of the semantic concept represented by the image input.

Based on one or more of the second domain representations of the first set, candidate third domain representation(s) of the semantic concept may be conditionally sampled from a second stochastic process that translates from the second domain to the third domain. If the second domain represented DSL, then the third domain may represent, for instance, NL, in which case the second stochastic process may be a DSL-to-NL translator. Likewise, if the second domain represented NL, then the third domain may represent, for instance, DSL, in which case the second stochastic process may be a NL-to-DSL translator.

In some implementations where the third domain represents a particular DSL, such as a particular programming language, the candidate third domain representations may be candidate instances of source code, written in the particular programming language, which can be executed to affect the transformation between the inputs and outputs (more generally, to implement the semantic concept) conveyed by the original input. The resulting transformation (e.g., synthetic image) may then be compared to the input (e.g., original image), and a result of that comparison (e.g., a similarity measure between respective reduced-dimensionality embeddings generated from the images) may be used to judge the source code instance. In some implementations, this may include compiling each instance of source code (those instances of source code that fail to compile may be discarded) and executing them (notably deterministic, rather than stochastic, process) to generate output. Alternatively, where the source code instances are written in an interpretable programming language, they may be interpreted, rather than compiled and executed. At any rate, the similarity measure may be used as a signal for conditionally sampling from other stochastic processes and/or for ultimately selecting one or more representations of the original semantic concept for downstream processing.

Additionally or alternatively, and continuing with the working example, a second set of candidate second domain representations of the semantic concept may be conditionally sampled from a third stochastic process—which translates from the third domain to the second domain-based on candidate third domain representation(s) of the semantic concept. To recap, two sets of second domain representations of the semantic concept have now been created. The first set was sampled from the first stochastic process that translated from the first domain to the second domain, and the second set was sampled from the third stochastic process that translated from the third domain back to the second domain. For example, there may now be two sets of candidate NL descriptions of the original input semantic concept (if the second domain is the NL domain). Or, if the second domain corresponds to a DSL, there may now be two sets of candidate DSL (e.g., source code instances) that represent the originally-input semantic concept.

In various implementations, pairs of candidate second domain representations sampled across the first and second sets may be compared, e.g., to determine which pairs are most coherent and/or in harmony (e.g., semantically, functionally). This determination may be used, alone or in conjunction with other signals (e.g., probabilities or confidences of individual representations) to select which representation(s) are suitable for downstream processing. This comparison may be performed in various ways. In some implementations, the comparison may include determining similarity measures between reduced-dimensionality embeddings generated from each candidate second domain representations of each pair. Similarity measures may be computed using any number of similarity functions, such as Euclidean distance, cosine similarity, dot product, dual encoder representations, etc. Based on the similarity measures, one or more second domain representations of the semantic concept may be selected, e.g., for output to a user and/or as input for downstream processing. For example the selected second domain representation may be presented as output to the user, e.g., as part of a dialog with an artificial intelligence (AI) dialog agent (also known as a "virtual assistant" or "automated assistant").

Implementations described herein may give rise to various technical advantages. With virtual assistants, for instance, techniques described herein allow users to have multi-modal conversations with virtual assistants. This may enable the users to perform various tasks more quickly (e.g., with reduced latency) and efficiently, conserving computing resources (e.g., memory, processor cycles, network bandwidth) and/or energy that might otherwise be required for additional dialog turns to accomplish the user's goal. In various implementations, a user may provide, as input to a virtual assistant, a representation of a semantic concept in one domain/modality. The user may receive, as output from the virtual assistant, dialog that includes a representation of the same semantic concept (or a related semantic concept) in another domain/modality. For example, the user could provide one or more images showing a base state and a successor/target state of some environment. The virtual assistant could provide a natural language and/or DSL representation of the transformation. This may enable the user, for instance, to automatically generate source code that affects the transformation, and/or to generate a caption that describes the transformation.

In some implementations, humans may interject themselves into the process, e.g., as another input to the cycle of stochastic processes, to guide the conditional sampling performed across the other processes. For instance, a user may wish to convert spreadsheets organized according to a first schema to spreadsheets organized according to a second schema. The second schema may include, for instance, a line graph showing a trend in some of the data. As input, the user may provide a spreadsheet in the first schema and a spreadsheet in the target second schema. Techniques described herein may be implemented to generate, for instance, an instance of DSL configured to convert the first spreadsheet to the second, as well as natural language describing the transformation.

Should the user disagree with all or part of the natural language description (or the DSL instance), the user can provide natural language input that more accurately describes what he or she desires. That natural language input can be used to conditionally sample from one or more of the stochastic processes and generate more coherent inferences across the multiple domains in play. For instance, the user may say, "The vertical axis of the line graph needs to be proportionate to the range of possible values from column 3." This input may be processed as described herein to help generate more coherent inferences. For example, an instance of DSL generated subsequently may include computer code that is more functionally in tune with what the user desires. Once the user indicates approval, e.g., of the instance of DSL or output generated therefrom, that instance of DSL may be used downstream, e.g., to translate a batch of spreadsheets from the first schema to the second schema.

More generally, the ensemble-based approaches described herein herein give rise to the advantage of providing new information from multiple modalities/domains. This allows for responses from any arbitrary stochastic process to be conditioned on other domains, thereby increasing the coherence and accuracy of the output of all of the constituent models in the ensemble.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs", tensor processing units or ("TPUs")) that execute computer-readable instructions stored in memory, or other types of logic such as application-specific integrated circuits ("ASIC"), field-programmable gate arrays ("FPGA"), and so forth. Some of the systems depicted in FIG. 1, such as a mutual constraint satisfaction inference system 102, may be implemented using one or more server computing devices that form what is sometimes referred to as a "cloud infrastructure," although this is not required. In other implementations, aspects of mutual constraint satisfaction inference system 102 may be implemented on client devices 120, e.g., for purposes of preserving privacy, reducing latency, etc.

Mutual constraint satisfaction inference system 102 may include any number of different components configured with selected aspects of the present disclosure. These may include any number of modules that implement stochastic processes, from simple models like sampling from a two parameter Gaussian to hundred-million parameter neural networks like a domain specific language (DSL) to natural language (NL) module 104, a grid to NL module 106, a NL to DSL module 108, and a grid to DSL module 110. As their names suggest, these modules 104-110 may be configured to translate representations of semantic concepts from one domain to another.

DSL to NL module 104 may process a DSL input (e.g., an instance of source code in a particular programming language) to generate one or more candidate representations of the input semantic concept (e.g., the functionality implemented by the instance of source code) in natural language. These natural language candidate representations may be, for instance, natural language descriptions of the functionality implemented by the instance of source code. In some implementations, DSL to NL module 104 may employ beam searching having a beam width of x (positive integer) that may dictate how many natural language candidate representations are generated.

Grid to NL module 106 may be configured to process an input in the form of one or more "grids." Grids are puzzle-like arrays of cells that may be filled with various colors, or left unfilled, to form any number of patterns. Grids are non-limiting examples of tools that can be used to train various models employed herein. More generally, any simulated environment or visual scene may be processed using a stochastic process as described herein; the grids depicted herein are merely an illustrative example. In some implementations, pairs of grids may be provided as input, including a base grid and a successor grid. The base grid may represent a starting point and the successor grid may represent a target or ending point, i.e. which cells should be filled with which colors, which cells should be left unfilled, etc. Grid to NL module 106 may, based on these grids, generate natural language that describes the transformation from the base grid to the successor grid.

NL to DSL module 108 may be configured to process an input in the form of natural language, e.g., types or spoken by a user 118, and generate one or more candidate DSL representations of the semantic concept conveyed by the natural language input. For example, the natural language input may describe functionality that is desired to be implemented in a programming language. NL to DSL module 108 may, based on this natural language input (e.g., based on an embedding generated therefrom), conditionally sample any number of candidate instances of source code in the desired programming language. Similar to before, in some implementations, NL to DSL module 108 may employ beam searching having a beam width of y (positive integer) that may dictate how many natural language candidate representations are generated.

Grid to DSL module 110 may be configured to process an input in the form of one or more grids and generate one or more candidate DSL representations of the semantic concept conveyed by the grid(s). Grid to DSL module 110 may, based on these grids, generate instances of DSL (e.g., source code instances) that affect the transformation from the base grid to the successor grid demonstrated by the input grids. This DSL may take various forms, such as Java, Python, C, C++, JavaScript, Perl, PHP, etc.

The stochastic process modules 104-110 depicted in FIG. 1 are not meant to be limiting. There may be any number of stochastic processes available to translate between any number of domains. Another example domain may be an action space over a computer application. A user may be able to provide, for instance, natural language input or examples of inputs/outputs, and the stochastic process associated with that domain may process that input to generate probability distributions over the action space of that computer application's domain. From those probability distributions, a sequence of actions may be selected and implemented automatically. In this way, user 118 can provide natural language input describing what he/she wants to do using the computer application, and that natural language may be translated into actions that are implemented automatically using the computer application. With techniques described herein, these actions may not necessarily be those that are of the highest probability, but instead may be those actions that are coherent with other inferences drawn from the user's natural language input in other domains. Other non-limiting examples of domains include domains associated with still images or animation, domains associated with robots and/or robot simulation, domains associated with industrial processes, domains associated with operating systems, and so forth.

Mutual constraint satisfaction inference system 102 may also include any number of databases for storing machine learning models and/or other data that is used to carry out selected aspects of the present disclosure. In FIG. 1, for instance, mutual constraint satisfaction inference system 102 includes a first database 105 that stores one or more machine learning models used by DSL to NL module 104, a second database 107 that stores one or more machine learning models used by grid to NL module 106, a third database 109 that stores one or more machine learning models used by NL to DSL module 108, and a fourth database 111 that stores one or more machine learning models used by grid to DSL module 110. These machine learning models may take various forms, including but not limited to various types of Sq2Sq machine learning models. Sq2Sq machine learning models can include, for instance, recurrent neural networks (RNNs), long short-term memory (LSTM) networks, gated recurrent unit (GRU) networks, various types of transformers (e.g., Bidirectional Encoder Representations from Transformers or "BERT" transformers), and so forth.

Mutual constraint satisfaction inference system 102 may include modules other than those that implement and/or sample from stochastic processes. For example, in FIG. 1, mutual constraint satisfaction inference system 102 includes an interface module 112, a coordinator module 114, and a virtual assistant cloud portion 116. The functionalities of these additional modules 112-116 will be described shortly. Any of modules 104-116 may be implemented using any combination of hardware and software. Moreover, any of modules 104-116 may be omitted, combined with other modules, etc.

Mutual constraint satisfaction inference system 102 may be operably coupled via one or more computer networks (117) with any number of client computing devices 120 that are operated by any number of users. In FIG. 1, for example, a user 118 operates a client device 120. As used herein, client device(s) 120 may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor and/or touchscreen display), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided.

In some implementations, client device 120 may include a virtual assistant client portion 122 that is configured to cooperate with virtual assistant cloud portion 116. When the term "virtual assistant" is used herein, it may be understood to include any combination of virtual assistant cloud portion 116 and virtual assistant client portion 122. Collectively, virtual assistant 116/122 may be configured to semantically process natural language input(s) provided by user 118 to identify one or more intent(s). Based on these intent(s), virtual assistant 116/122 may perform a variety of tasks, such as operating smart appliances, retrieving information, performing tasks, and so forth.

Interface module 112 may provide one or more human-computer-interfaces (HCIs), such as one or more graphical user interfaces (GUIs) that can be operated by various individuals, such as user 118, to perform various actions made available by mutual constraint satisfaction inference system 102. For example, interface module 112 may provide a GUI (e.g., a standalone application or a webpage) at client device that is operable to implement various techniques described herein. Additionally, interface module 112 may facilitate a speech-based interface (including speech-to-text processing, text-to-speech processing, etc.) that allows user 118 to participate in human-to-computer dialogs with virtual assistant 116/122.

Coordinator module 114 may be configured with selected aspects of the present disclosure to coordinate sampling of inferences (e.g., domain-specific representations of a semantic concept) from multiple different stochastic processes. Coordinator module 114 may be further configured to compare various permutations of the sampled inferences, e.g., by determining distances between embeddings of those inferences in embedding space. Based on these comparisons, coordinator module 114 may identify and/or select of inferences that are coherent across domains, notwithstanding those inferences' probabilities or confidences within individual domains.

Figure 2:
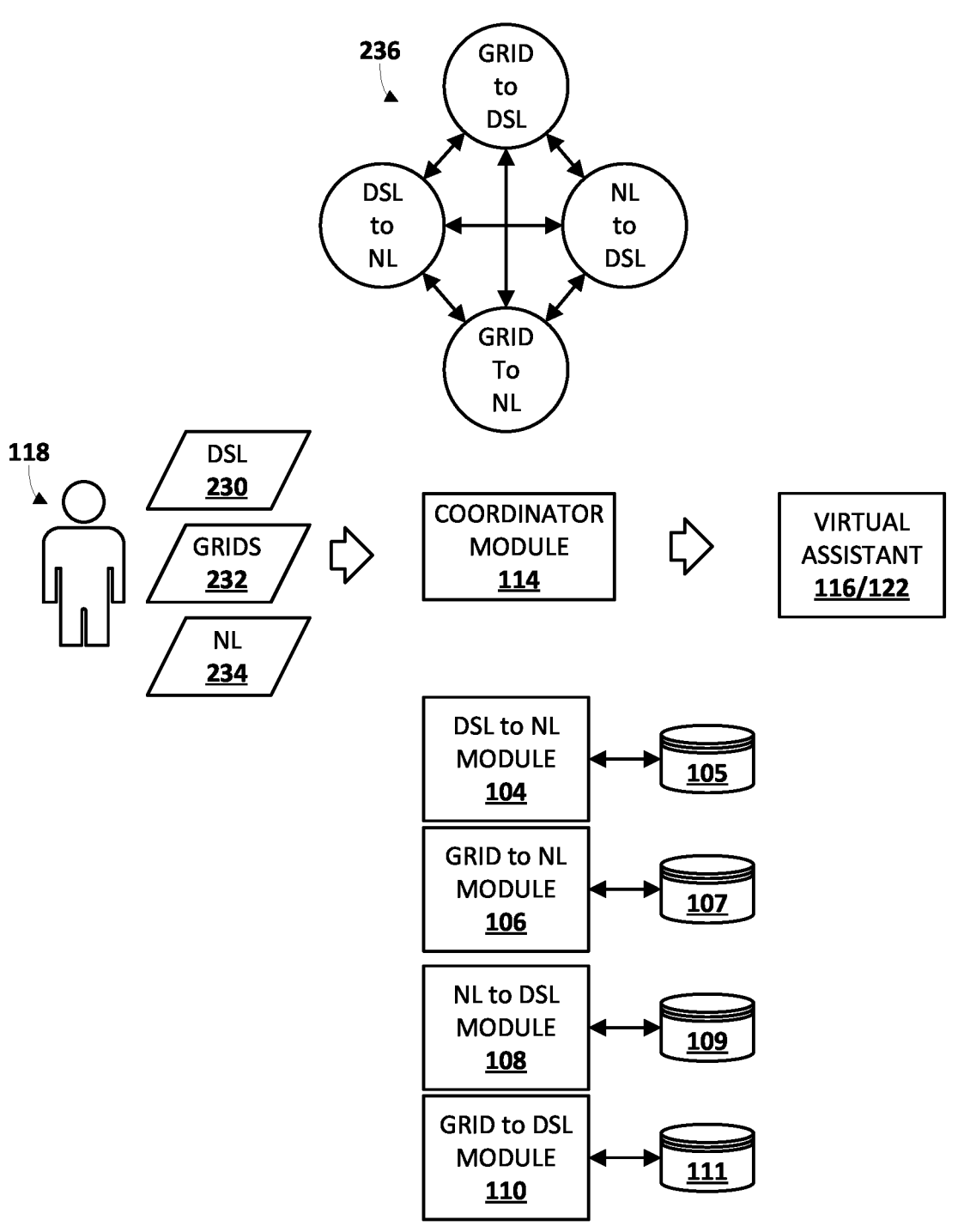
FIG. 2 schematically illustrates an example of how data may be exchanged and/or processed to find inference(s) that are coherent across domains, in accordance with various implementations.

FIG. 2 schematically depicts an example of how various components of FIG. 1 may process input data to identify/select/sample inferences (e.g., domain-specific representations of semantic concept(s) represented in the input data) that are coherent across domains. In some implementations, this identification, selection, and/or sampling may be performed irrespective of those inferences' individual probabilities or confidences within individual domains. Additionally or alternatively, in some implementations, both coherency between inferences determined using techniques described herein and individual inferences' probabilities/confidences may be used in tandem, e.g., as two signals that can be weighed when selecting the inference(s) that will ultimately be used for downstream processes, e.g., to be presented to a user.

Starting at left, user 118 may provide one or more inputs, such as one or more instances of DSL 230, one or more instances of grids 232, and/or one or more instances of natural language 234. Just as other domains are contemplated than those depicted in the figures, other types of inputs may be received as well. One non-limiting example would be base inputs and target outputs to be generated by a computer program—these could be in text form, e.g., typed (or pasted) into a command line interface, or provided as standalone text files. Another non-limiting example would be a recorded sequence of actions performed by a user via a HCI, such as a sequences of keystrokes/mouse actions performed on a GUI (e.g., to accomplish some task), a sequence of spoken commands provided to a virtual assistant, video input to capture movement of an organism or machine for translation into other domains (e.g., natural language description, conversion into animation markup language), etc.

The input(s) may be used to conditionally sample from applicable stochastic processes, such as processes 104-110 which were described previously. More particularly, coordinator module 114 may cause the input(s) to be processed in accordance with a graph 236 that sets forth relationships between nodes corresponding to stochastic processes 104-110. In some implementations, graph 236 may be a probabilistic graph, directed or undirected, and may be cyclic (include one or more cycles) in some cases. Thus, for instance, candidate representation(s) from grid to NL module 104 can be provided to one or more other modules 106-110, e.g., to facilitate conditional sampling from those other module's stochastic processes. Likewise, the other modules 106-110 may interact with each other in the same way.

As a result of this coordination based on graph 236, it is possible for coordinator module 114 to identify a most coherent inference (or a good enough inference, to keep computational costs constrained) in a particular domain (e.g., the domain requested by user 118, the domain required for downstream processing). In the example of FIG. 2, for instance, the downstream processing includes being provided to virtual assistant 116/122, e.g., so that virtual assistant 116/122 can return a requested result back to user 118.

FIGS. 3A-F depict multiple different examples of how coherent inferences can be identified under various circumstances. The examples shown in FIGS. 3A-F involve the input $G_{in}$ taking the form of base and target grids of cells that are selectively colored to exhibit various patterns. However, this is not meant to be limiting, and inputs may come in various other modalities/domains, such as images, text, simulation, etc. The nodes and edges shown in FIGS. 3A-F correspond to the nodes and edges depicted as part of graph 236 in FIG. 2.

Figure 3A:
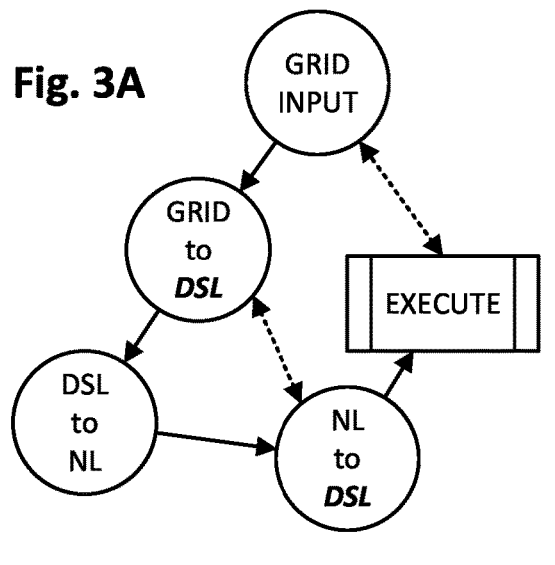
FIG. 3A schematically illustrates how techniques described may be employed in one example scenario, in accordance with various implementations.

In FIG. 3A, a plurality of instances of DSL (e.g., instances of source code in a given or requested programming language) $\hat{P}$ are conditionally sampled based on the grid input $G_{in}$ being processed by grid to DSL module 110, such that $\hat{P} \sim p$ ($P|G$, $\theta$) (with $\theta$ representing parameters or hyperparameters of a stochastic process). Next, instances of natural language $\hat{L}$ describing the semantic concept represented by the grid input are sampled conditionally on $\hat{P}$, e.g., from DSL to NL module 104, such that $\hat{L} \sim p(L|\hat{P}, \theta)$.

Next, another DSL instance $\hat{P}_2$ is generated conditionally based on $\hat{L}$, e.g., by NL to DSL module 108, such that $\hat{P}_2 \sim p(P|\hat{L}, \theta)$. At this point, in some implementations, the DSL instance $\hat{P}_2$ may be executed (e.g., compiled and executed, interpreted, etc.) to produce a new set of grids $G_{out}$ such that $G_{out} = \hat{P}(G_{in})$ $G_{in}$ may then be compared to $G_{in}$, and the result of that comparison may be used as a signal for determining whether any of the DSL inferences in $\hat{P}$ or $\hat{P}_2$ are sufficiently coherent and/or correct (e.g., if $G_{out} = G_{in}$, then that DSL performed its intended function).

However, in some implementations, the process may continue, with the sampled DSL instances $\hat{P}$ and $\hat{P}_2$ being embedded, e.g., such that $f_P(\hat{P}_i)$, for i=1, . . . , n. Pairs of the embeddings may then be compared (as indicated in FIGS. 3A-F with the dashed arrows and bolded italics), e.g., using similarity measures such as cosine similarity, e.g., until some similarity threshold is met. Those pairs that meet the threshold may or may not be selected (e.g., depending on whether those instances of source code functioned properly) for downstream processing.

Figure 3B:
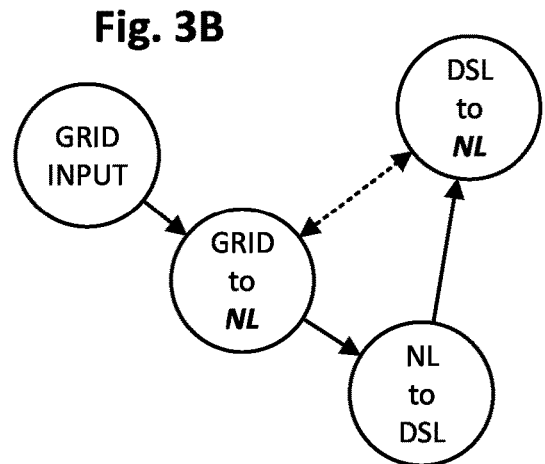
FIG. 3B schematically illustrates how techniques described may be employed in another example scenario, in accordance with various implementations.

FIGS. 3B-F proceed similarly and therefore will be described more succinctly. In FIG. 3B, the grid input is used to conditionally sample from the stochastic process implemented by grid to NL module 106. Then, one or more of the resulting candidate natural language inference(s) are used to conditionally sample from the stochastic process implemented by NL to DSL module 108. Lastly, one or more of the resulting candidate DSL instance(s) are used to conditionally sample from the stochastic process implemented by DSL to NL module 104. The candidate natural language inferences sampled from both the grid to NL and DSL to NL stochastic processes are then compared as shown by the dashed arrows, e.g., by being embedded and determining similarity measures.

Figure 3C:
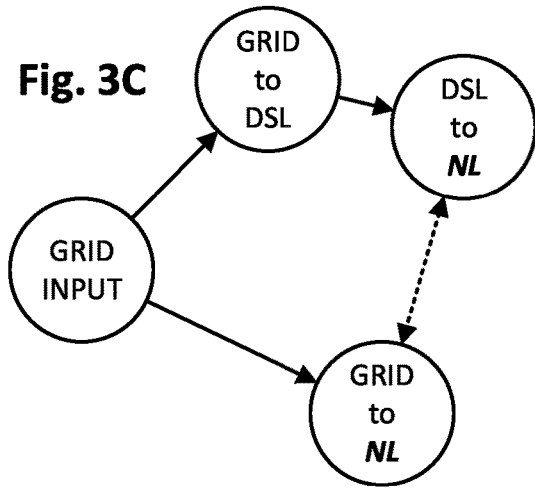
FIG. 3C schematically illustrates how techniques described may be employed in another example scenario, in accordance with various implementations.

In FIG. 3C, the process proceeds in parallel from grid input to stochastic processes that produce both a set of candidate DSL inferences and a first set of candidate NL inferences. The candidate DSL instance(s) are then used to conditionally sample from a DSL to NL stochastic process to generate an additional set of NL candidate inferences. The pairs of candidate NL inferences from the first set and the additional set are then sampled and compared to determine similarity measures and, ultimately, select coherent inferences.

Figure 3D:
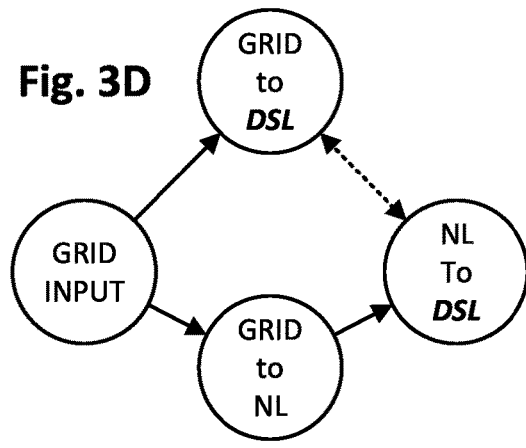
FIG. 3D schematically illustrates how techniques described may be employed in another example scenario, in accordance with various implementations.

FIG. 3D is another example of where the process proceeds in parallel from grid input to stochastic processes that produce both a first set of candidate DSL inferences and a set of candidate NL inferences. However, the next step is reversed from what was depicted in FIG. 3C: the set of candidate NL inferences is used to conditionally sample from the NL to DSL stochastic process to generate a second set of candidate DSL inferences, and pairs of candidate DSL inferences from the first and second sets are sampled for comparison.

Figure 3E:
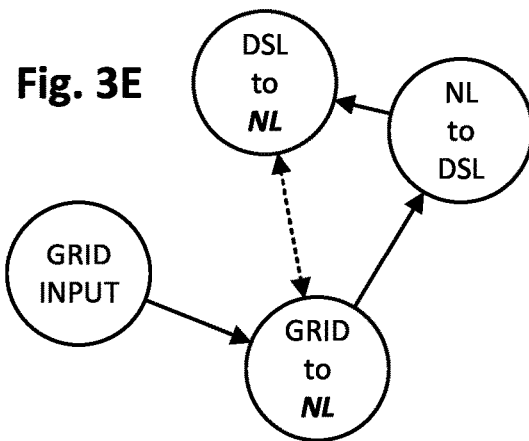
FIG. 3E schematically illustrates how techniques described may be employed in another example scenario, in accordance with various implementations.
Figure 3F:
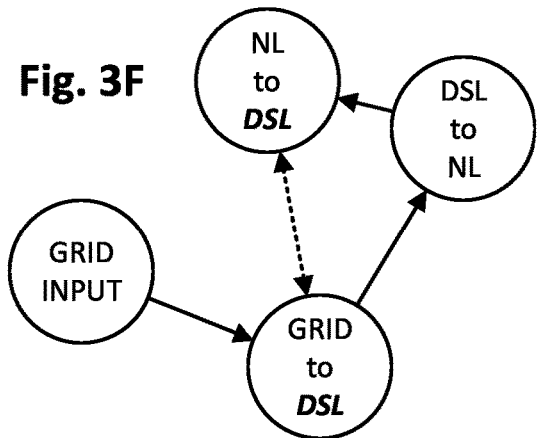
FIG. 3F schematically illustrates how techniques described may be employed in another example scenario, in accordance with various implementations.

In FIG. 3E, the grid input is used to conditionally sample from the grid to NL stochastic process. At least some of the resulting candidate NL inferences are then used to conditionally sample from the NL to DSL stochastic process. At least some of the resulting candidate DSL instances are then used to sample from the DSL to NL stochastic process. Pairs of results from the grid to NL and DSL to NL stochastic processes are then embedded and compared as described previously. FIG. 3F is similar to FIG. 3E, except that the roles of DSL and NL are reversed.

While the comparisons in FIGS. 3A-F involve evaluating embeddings generated from data in the same domain, this is not meant to be limiting. As will be described below with reference to FIG. 7, in some implementations, techniques such as contrastive learning may be employed to train encoder modules to process encoder inputs in different modalities into embeddings, in a way that embeddings that represent semantically similar or matching concepts will be "closer" to each other, irrespective of the domains that yielded those embeddings, than embeddings that are not semantically similar.

FIGS. 4-6 schematically depict an example how techniques described herein may be employed with a virtual assistant 116/122. In FIG. 4, a user (not depicted) asks the virtual assistant, "Can you help me solve these puzzles?" The virtual assistant responds in the affirmative, at which point the user provides some before and after images of grids having some patterns of squares filled in. The top row of grids are base grids, and the bottom row of grids are corresponding target grids. Different color cells are represented by the different shading employed in FIGS. 4-6. The virtual assistant then says, "OK, processing . . . "

At this point, the grid input may be used to conditionally sample from the grid to DSL stochastic process and/or the grid to NL stochastic process, as indicated by the bolding in FIG. 5. On the left side of FIG. 5 are examples of both natural language and DSL that were sampled from these processes. The grids are reproduced at top right in FIG. 5 for ease of reading. First, the virtual assistant provides natural language output describing the base grids (top row). This natural language description appears, for the most part, to correctly describe the base grids. However, there is no evidence one way or the other in either the base or target grids that the "partial parts of that same shape" are "oriented in different directions from the main shape."

Then, the virtual assistant provides natural language output describing the output grids. Here, it can be seen from the shading that the expanded shapes in the output grids (bottom row) are different colors from each other, and therefore cannot all be "blue and pink." Otherwise, the natural language description of the outputs appears mostly correct.

At bottom, DSL code is presented, e.g., as a link to the file "file.dsl," that describes, in a DSL (e.g., selected programming language such as Python or Java) how to implement the transformation from the base grids to the target grids. Although not depicted in the figures, in some cases, this DSL may be executed to generate new grids, as described previously with relation to FIG. 3A, and the grids that result from that output may be presented to the user and/or compared to the base/target grids.

FIG. 6 depicts an example of how a human can inject themselves into the process, effectively providing an additional source of input that can be used to condition inferences that are coherent across domains as described herein. In FIG. 6, the user has indicated that there is something wrong with one or more of the outputs shown in FIG. 5. To remedy this, and potentially help condition model(s) employed by various stochastic processes described herein, the user provides natural language input that accurately describes the transformation from the base grids (top row) to the target grids (bottom row). As shown by the bolding of graphs in FIG. 6, all four stochastic processes are now being implemented. Candidate representations/inferences are being conditionally sampled from each stochastic process based on candidate representations/inferences from the others. This process of FIGS. 4-6 may continue until, for instance, the user provides positive feedback about one or more representations/inferences that are presented. For example, when the user approves of a candidate natural language inference and output generated from a candidate DSL instance, the process may end.

FIG. 7 is a flowchart illustrating an example method 700 for practicing selected aspects of the present disclosure, according to implementations disclosed herein. For convenience, the operations of the flow chart are described with reference to a system that performs the operations. This system may include various components of various computer systems, such as one or more components of mutual constraint satisfaction inference system 102. Moreover, while operations of method 700 are shown in a particular order, this is not meant to be limiting. One or more operations may be reordered, omitted or added.

At block 702, the system may receive, e.g., as input from a user or from an upstream process, a first domain representation of a semantic concept. For example, a user may engage with virtual assistant 116/122 as shown in FIGS. 4-6 to provide input, such as base and target grids, program input and target output, natural language describing desired DSL and/or visual output, a sequence of actions performed using an HCl, natural language describing desired animation, DSL for which the user desires natural language description, etc.

At block 704, the system may, based on the first domain representation of the semantic concept, conditionally sample a first set of candidate second domain representations of the semantic concept from a first stochastic process that translates from the first domain to the second domain. Examples of this were depicted in FIGS. 3A-F, wherein the grid input was used to conditionally sample from various stochastic processes (104-110 in FIG. 1).

At block 706, the system, based on one or more second domain representations of the first set, may conditionally sample candidate third domain representation(s) of the semantic concept from a second stochastic process that translates from the second domain to the third domain. This operation is similar to that performed in block 704, except in different domains. Based on one or more of the candidate third domain representations of the semantic concept, at block 708, the system may conditionally sample a second set of candidate second domain representations of the semantic concept from a third stochastic process that translates from the third domain back to the second domain.

At block 710, the system may evaluate (e.g., compare) pairs of candidate second domain representations sampled across the first and second sets. In some implementations, techniques such as bipartite graph matching and/or the Hungarian method may be employed to evaluate candidate second domain representations across the first and second sets. In various implementations, this evaluation may include determining similarity measures between a first plurality of reduced-dimensionality embeddings generated from the candidate second domain representations of the first set and a second plurality of reduced-dimensionality embeddings generated from the candidate second domain representations of the second set.

Implementations described herein are not limited to comparing embeddings generated from inferences in the same domain. In some implementations, contrastive learning may be employed to enable comparison of embeddings generated based on inferences in different domains. For instance, contrastive learning, e.g., triplet loss, may be used to train a model to compare embeddings of instances of DSL to embeddings of natural language descriptions. As one example, an encoder model (e.g., various types of neural networks) may be trained by generating an anchor input embedding from a DSL instance, as well as a first embedding (positive input) generated from natural language known to accurately describe the DSL instance and a second embedding (negative input) generated from natural language that less accurately describes the DSL instance. To the extent the first embedding is more distant from the anchor input than the second embedding, techniques such as stochastic gradient descent and/or back propagation may be employed to train the encoder model, such that the first embedding will be closer to the anchor embedding subsequently.

Based on the evaluation of block 710 (e.g., based on the similarity measures), at block 712, the system may select one or more of the second domain representations of the semantic concept as input for a downstream computer process (e.g., for virtual assistant 116/122 to output, or for another downstream process).

Figure 8:
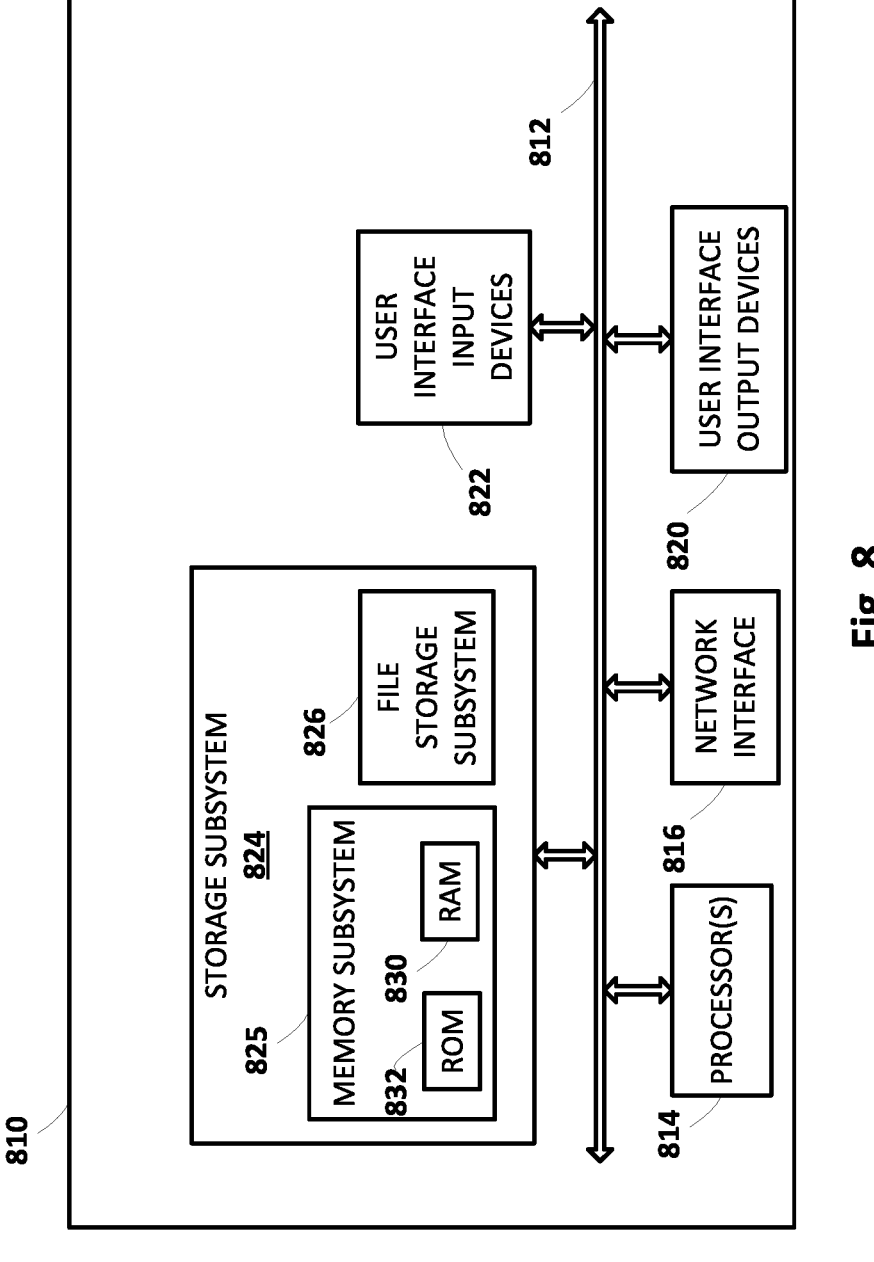
FIG. 8 illustrates an example architecture of a computing device.

FIG. 8 is a block diagram of an example computing device 810 that may optionally be utilized to perform one or more aspects of techniques described herein. In some implementations, one or more of client computing device 120, mutual constraint satisfaction inference system 102, and/or other component(s) may comprise one or more components of the example computing device 810.

Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touch screen incorporated into the display, audio input devices such as voice recognition systems, microphones, and/or other types of input devices.

In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method 700 of FIG. 7.

These software modules are generally executed by processor 814 alone or in combination with other processors. Memory 825 used in the storage subsystem 824 can include a number of memories including a main random-access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors and comprising:

receiving, as input from a user, a first domain representation of a semantic concept;

based on the first domain representation of the semantic concept, conditionally sampling a first set of candidate programming language domain representations of the semantic concept from a first stochastic process that translates from the first domain to the programming language domain, wherein the programming language domain comprises a second domain;

based on one or more programming language domain representations of the first set, conditionally sampling candidate third domain representations of the semantic concept from a second stochastic process that translates from the programming language domain to the third domain;

based on one or more of the candidate third domain representations of the semantic concept, conditionally sampling a second set of candidate programming language domain representations of the semantic concept from a third stochastic process that translates from the third domain to the programming language domain;

evaluating pairs of candidate programming language domain representations sampled across the first and second sets, wherein the evaluating comprises:

executing or interpreting a first candidate instance of source code sampled from the first set to generate a first output, executing or interpreting a second candidate instance of source code sampled from the second set to generate a second output, and comparing the first and second outputs; and based on the evaluation, selecting one or more of the programming language domain representations of the semantic concept as input for a downstream computer process.

2. The method of claim 1, wherein the evaluation comprises:

determining similarity measures between a first plurality of reduced-dimensionality embeddings generated from the candidate programming language domain representations of the first set and a second plurality of reduced-dimensionality embeddings generated from the candidate programming language domain representations of the second set; and based on the similarity measures, selecting the one or more programming language domain representations of the semantic concept as the input for the downstream computer process.

3. The method of claim 1, wherein the first stochastic process comprises an attention-based transformer machine learning model, and the first set of candidate programming language domain representations of the semantic concept comprises multiple candidate token sequences generated by performing beam searching during application of the attention-based transformer machine learning model.

4. The method of claim 1, wherein the evaluation further comprises comparing the first output to the first domain representation of the semantic concept.

5. The method of claim 1, wherein the third domain comprises natural language, and the candidate third domain representations of the semantic concept comprise natural language descriptions of respective pieces of source code in the first set.

6. The method of claim 1, wherein the first domain representation of the semantic concept comprises one or more images that depict a base visual state and a successor visual state.

7. The method of claim 1, further comprising applying a contrastive model to compare one or more candidate programming language domain representations sampled from the first set with one or more of the candidate third domain representations of the semantic concept using a contrastive model, wherein the selecting is further based on output generated from applying the contrastive model.

8. The method of claim 1, wherein at least one of the first, second, and third stochastic processes comprises an attention-based transformer machine learning model.

9. A system comprising one or more processors and memory storing instructions that, in response to execution by the one or more processors, cause the one or more processors to:

receive, as input from a user, a first domain representation of a semantic concept;

based on the first domain representation of the semantic concept, conditionally sample a first set of candidate programming language domain representations of the semantic concept from a first stochastic process that translates from the first domain to the programming language domain, wherein the programming language domain comprises a second domain;

based on one or more programming language domain representations of the first set, conditionally sample candidate third domain representations of the semantic concept from a second stochastic process that translates from the programming language domain to the third domain;

based on one or more of the candidate third domain representations of the semantic concept, conditionally sample a second set of candidate programming language domain representations of the semantic concept from a third stochastic process that translates from the third domain to the programming language domain;

evaluate pairs of candidate programming language domain representations sampled across the first and second sets, wherein the instructions to evaluate comprise instructions to:

execute or interpret a first candidate instance of source code sampled from the first set to generate a first output, execute or interpret a second candidate instance of source code sampled from the second set to generate a second output, and compare the first and second outputs; and based on the evaluation, select one or more of the programming language domain representations of the semantic concept as input for a downstream computer process.

10. The system of claim 9, wherein the instructions to evaluate comprise instructions to:

determine similarity measures between a first plurality of reduced- dimensionality embeddings generated from the candidate programming language domain representations of the first set and a second plurality of reduced-dimensionality embeddings generated from the candidate programming language domain representations of the second set; and based on the similarity measures, select the one or more programming language domain representations of the semantic concept as the input for the downstream computer process.

11. The system of claim 9, wherein the first stochastic process comprises an attention-based transformer machine learning model, and the first set of candidate programming language domain representations of the semantic concept comprises multiple candidate token sequences generated by performing beam searching during application of the attention-based transformer machine learning model.

12. The system of claim 9, wherein the evaluation further comprises comparing the first output to the first domain representation of the semantic concept.

13. The system of claim 9, wherein the third domain comprises natural language, and the candidate third domain representations of the semantic concept comprise natural language descriptions of respective pieces of source code in the first set.

14. The system of claim 9, wherein the first domain representation of the semantic concept comprises one or more images that depict a base visual state and a successor visual state.

15. The system of claim 9, further comprising applying a contrastive model to compare one or more candidate programming language domain representations sampled from the first set with one or more of the candidate third domain representations of the semantic concept using a contrastive model, wherein the selecting is further based on output generated from applying the contrastive model.

16. At least one non-transitory computer-readable medium comprising instructions that, when executed by one or more processors, cause the one or more processors to:

receive, as input from a user, a first domain representation of a semantic concept;

based on the first domain representation of the semantic concept, conditionally sample a first set of candidate programming language domain representations of the semantic concept from a first stochastic process that translates from the first domain to the programming language domain, wherein the programming language domain comprises a second domain;

based on one or more programming language domain representations of the first set, conditionally sample candidate third domain representations of the semantic concept from a second stochastic process that translates from the programming language domain to the third domain;

based on one or more of the candidate third domain representations of the semantic concept, conditionally sample a second set of candidate programming language domain representations of the semantic concept from a third stochastic process that translates from the third domain to the programming language domain;

evaluate pairs of candidate programming language domain representations sampled across the first and second sets, wherein the instructions to evaluate comprise instructions to:

execute or interpret a first candidate instance of source
code sampled from the first set to generate a first
output, execute or interpret a second candidate instance of
source code sampled from the second set to generate
a second output, and compare the first and second outputs; and based on the evaluation, select one or more of the pro-
gramming language domain representations of the
semantic concept as input for a downstream computer
process.

* * * * *